United States Patent
Kumar et al.

(10) Patent No.: US 10,693,757 B2
(45) Date of Patent: Jun. 23, 2020

(54) INTERFACE LAYER FOR DIAGNOSTIC SUPPORT OF NETWORK-ACCESSIBLE DEVICES

(71) Applicant: salesforce.com, inc., San Francisco, CA (US)

(72) Inventors: Amit Kumar, Flower Mound, TX (US); Tushar G. Jadhav, Plainsboro, NJ (US); Suchindra Rengan, Chester Springs, PA (US)

(73) Assignee: salesforce.com, inc., San Francisco, CA (US)

( * ) Notice: Subject to any disclaimer, the term of this patent is extended or adjusted under 35 U.S.C. 154(b) by 90 days.

(21) Appl. No.: 15/414,612

(22) Filed: Jan. 24, 2017

(65) Prior Publication Data
US 2018/0212852 A1      Jul. 26, 2018

(51) Int. Cl.
| | |
|---|---|
| H04L 12/26 | (2006.01) |
| H04L 29/08 | (2006.01) |
| H04W 12/08 | (2009.01) |
| H04L 29/06 | (2006.01) |
| H04W 12/06 | (2009.01) |

(52) U.S. Cl.
CPC ............ *H04L 43/10* (2013.01); *H04L 43/065* (2013.01); *H04L 63/101* (2013.01); *H04L 67/12* (2013.01); *H04W 12/08* (2013.01); *H04W 12/06* (2013.01)

(58) Field of Classification Search
CPC ......... H04L 43/10; H04L 43/65; H04L 67/12; H04W 12/06
See application file for complete search history.

(56) References Cited

U.S. PATENT DOCUMENTS

| | | | |
|---|---|---|---|
| 8,095,476 B2 | 1/2012 | Biemer et al. | |
| 8,096,809 B2 | 1/2012 | Burgin et al. | |
| 8,825,752 B1 | 9/2014 | Madhavan | |
| 8,863,075 B2 | 10/2014 | Said et al. | |

(Continued)

OTHER PUBLICATIONS

Margaret Rouse,"Salesforce Service Cloud," WhatIs.com, Jan. 2016, http://searchsalesforce.techtarget.com/definition/Salesforce-Service-Cloud, 5 pages.

(Continued)

*Primary Examiner* — Jianye Wu
(74) *Attorney, Agent, or Firm* — Kowert, Hood, Munyon, Rankin & Goetzel, P.C.

(57) ABSTRACT

Techniques are disclosed relating to diagnosing a network-accessible device. A first computer may store authorization information associated with a plurality of network-accessible computing devices associated with a user. The first computer system may receive, from a second computer system, a request from the user to perform a diagnostic operation that involves communication between a third computer system and a particular one of the plurality of network-accessible computing devices. The first computer system may request, based on a permission indicated by the stored authorization information, that the third computer system retrieve diagnostic information from the particular network-accessible computing device and perform the diagnostic operation. The first computer system may receive, from the third computer system, result information relating to the diagnostic operation.

19 Claims, 12 Drawing Sheets

(56) References Cited

U.S. PATENT DOCUMENTS

| | | | | |
|---|---|---|---|---|
| 2008/0109679 A1* | 5/2008 | Wright | ................. | H04L 63/102 |
| | | | | 714/37 |
| 2012/0047391 A1 | 2/2012 | Dhoolia et al. | | |
| 2013/0132775 A1* | 5/2013 | Onoue | ................. | G06Q 10/063 |
| | | | | 714/33 |
| 2015/0281190 A1* | 10/2015 | Seetharam | .......... | H04L 63/0435 |
| | | | | 713/171 |

OTHER PUBLICATIONS

What is the Alexa Skills Kit?, https://web.archive.org/web/20170130074539/https://developer.amazon.com/alexa-skills-kit, 18 pages. [Retreived Apr. 20, 2017].

\* cited by examiner

INTERFACE LAYER FOR DIAGNOSTIC SUPPORT OF NETWORK-ACCESSIBLE DEVICES

BACKGROUND

Technical Field

This disclosure relates generally to interactions with network-accessible devices, and, more specifically, to providing diagnostic support for such devices.

Description of the Related Art

More and more network-accessible devices that perform different functions are becoming available to consumers, particularly as support for the Internet of Things (IOT) grows. Consumers are thus beginning to purchase products that allow them to control various aspects of their lives through their mobile devices. These products include devices such as smart lights that can be turned off and on, thermostats that can be adjusted to control temperature, cameras that can be used to monitor front doors, etc. To assist in this endeavor, manufacturers are allowing users to register their devices and to access them through applications on their mobile devices. As an example, a consumer may buy and install a NEST Learning Thermostat™ and, thereafter, may adjust the temperature in their house.

Figure 1:
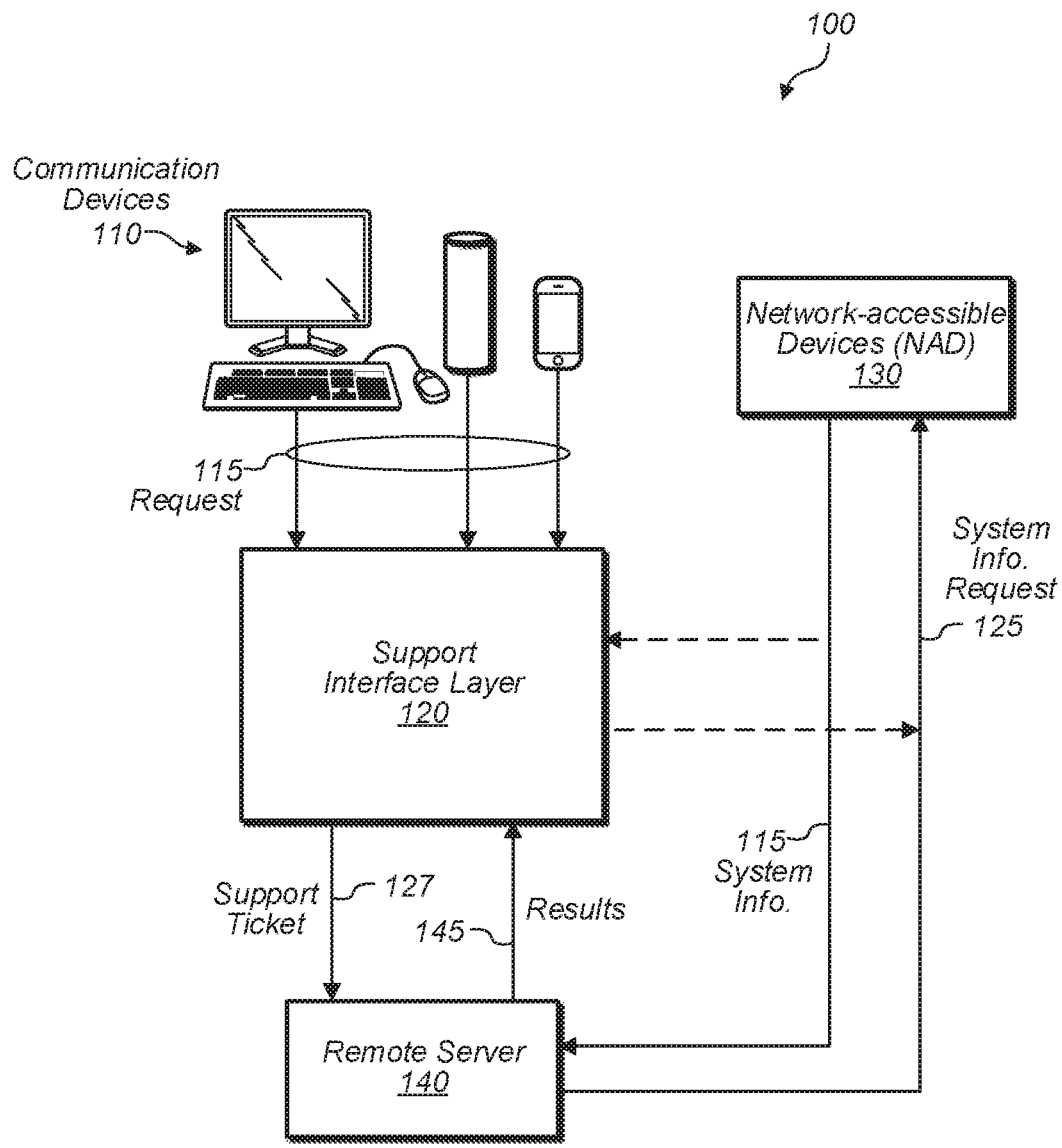
FIG. 1 is a block diagram illustrating exemplary elements of a system that facilitate the resolution of a problem discovered in a network-accessible device, according to some embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated (e.g., no electrical power is currently being supplied to it). Thus, an entity described or recited as "configured to" perform some task refers to something physical, such as a device, circuit, memory storing program instructions executable to implement the task, etc. This phrase is not used herein to refer to something intangible.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a multi-tenant database system having eight tenants, the terms "first" and "second" tenants can be used to refer to any two of the eight tenants.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

As consumers begin to purchase more network-accessible devices (NADs), they often run into problems that they cannot diagnose—e.g., a thermostat displays 72° F., but the actual temperature is 80° F. The term "network-accessible device" is used generically herein to refer to a computer system that is accessible via a network (e.g. local area network (LAN), wide area network (WAN), etc.). Furthermore, as the number of specific network-accessible devices associated with a particular consumer (e.g., registered to, owned by, or used by the consumer) grows, it can become challenging to efficiently interact with a given one of these NADs. To fix such problems, consumers often spend several hours searching for a support number, calling the number, explaining the problem, and waiting for a possible solution. Furthermore, in explaining the problem, consumers often don't have nor know how to obtain the necessary information needed to assist a support representative in diagnosing the problem. Accordingly, there is a need for a more user-friendly and seamless process for getting help with such devices.

The present disclosure describes embodiments in which a user may more quickly and efficiently request support in addressing potential or actual issues with their NAD. In such embodiments, a computer system (e.g., a support interface layer) may receive an initial request from a user, via a communication device, for assistance in diagnosing their NAD. The computer system may use information in the request (e.g., description of the problem, a user identifier, a NAD identifier, etc.) to create an information package (e.g., a support ticket) for a tenant of a remote system (e.g., a multi-tenant database system) that is capable of performing a diagnosis on the requested NAD. Before creating the support ticket, the computer system may determine whether it has permission to retrieve information (e.g. system logs, configurations, etc.) from the requested NAD or cause the tenant to retrieve such information. In response to receiving the support ticket and, in some cases, retrieving the information from the NAD, the remote system may perform a diagnosis on the NAD and provide results of the diagnosis to the computer system. In turn, the computer system may provide the results to the requesting user.

For example, as will be described in greater detail below, in various embodiments, upon determining a problem with their NAD, a user may ask their intelligent personal assistant (e.g., Amazon Alexa™, Microsoft Cortana™, Apple Siri™, etc.), using a natural form of expression, for assistance with their NAD. The assistant may send the user's request to a support interface layer that may determine the appropriate tenant and either retrieve system information from the user's NAD directly or request that the tenant retrieve such information. Thereafter, the support interface layer may open a support ticket, which includes the NAD's system information, with the tenant. In response, the tenant may diagnose the problem and provide a possible solution to the support interface layer. In turn, the support interface layer may provide the solution to the user. In doing so, the user may be able to receive help without wasting countless hours searching for it.

Turning now to FIG. 1, a block diagram of one embodiment of a system 100 is shown that facilitates the resolution of a problem discovered in a NAD associated with a user. System 100 may be used to discover and address problems, even those that are not readily apparent to a user of the NAD. System 100 may also assist users in answering any questions that they may have about their NADs. In the illustrated embodiment, system 100 includes communication devices 110, a support interface layer 120, network-accessible devices (NADs) 130, and a remote server 140. Layer 120 may be hosted on a platform as a service (PaaS) such as HEROKU since it may be desirable to implement layer 120 in an environment with certain capabilities such as event-driven architecture, asynchronous I/O, and web hooks (other platforms such as software as a service (SaaS) and On-Premise Platforms may not offer these capabilities). Implementing layer 120 on a PaaS may also be desirable since a PaaS provides an environment that may auto-scale and overcome the limitations of a multitenant platform that enforces strict limits on the on the platform to ensure there is no monopoly on shared resources.

In various embodiments, system 100 may implement a hub-and-spoke model in which various spokes (e.g., servers 140) connected to a central hub (e.g., layer 120). For example, layer 120 may act as a central hub that communicates with multiple customer-based systems and providers such as SALESFORCE, MICROSOFT DYNAMICS CRM, SAP CRM, TALKDESK, etc. That is, layer 120 may be in communication with multiple support representatives across multiple servers 140. But, in some embodiments, layer 120 and server 140 may be implemented by the same computer system.

Communication devices 110, in one embodiment, are computer systems that are capable of generating an initial request (shown as request 115) for assistance in resolving a problem faced by a user. In some cases, a user may provide input to a device 110 using natural forms of expression, both spoken language and textual description. That is, in various embodiment, devices 110 may implement an intelligent personal assistant that is capable of processing and interpreting forms of expression—e.g., a user saying, "My toaster does not seem to be cooking the bread." While a user may be described as speaking to devices 110, in some embodiments, devices 110 may use chat-based forms of communication (e.g., a chat box) in which a user provides a textual description of their problems. After receiving input from a user and processing it, devices 110 may generate request 115 to include the verbal or textual description supplied by the user along with information pertaining to the user and the particular NAD for which assistance is requested. Thereafter, devices 110 may send request 115 to support interface layer 120 for service.

Support interface layer 120, in one embodiment, is a computer system configured to both retrieve system information from NADs 130 and assist a user in establishing communication with a support representative. In various embodiments, layer 120 receives an initial request 115 from a device 110 for assistance in diagnosing a problem with their NAD—e.g., the camera monitoring the front door flickers every ten seconds. In some instances, the initial request 115 from device 110 may ask for a general synopsis of the integrity of a user's NAD—e.g., the user asks when or whether the air filters need to be cleaned for an A/C window unit. After receiving the initial request 115, layer 120 may select a suitable entity to help resolve the problem. In some instances, this entity may be a particular tenant of a multi-tenant database hosted by remote server 140. Accordingly, this paradigm may permit a user of the particular tenant (e.g., a customer support representative) to assist in resolving the requesting user's problem. In some cases, the particular tenant may be the manufacturer of the particular NAD 130 or a third-party acting on behalf of the manufacturer. In order to select this tenant, layer 120 may use information included in the initial request 115 such as a user identifier, a NAD identifier, a user's description of the problem, etc.—e.g., an initial request 115 includes a NAD identifier that specifies a serial number of the NAD. Thus, a NAD identifier may, for example, determine that the NAD corresponds to particular type of thermostat and route the request accordingly.

When a tenant has been selected, in various embodiments, layer 120 collects information that may be necessary for diagnosing a problem with the user's NAD. Depending on the nature of the application program interface (API) used to communicate with the particular NAD 130 (that is, whether the API is open or closed to outside entities), either layer 120 may send a request for system information (shown as a dotted line to system information request 125) to the NAD 130 or a tenant may send such a request via remote server 140. In some embodiments, when an API is open (i.e. publicly available) and layer 120 is authorized to communicate with the particular NAD 130, layer 120 retrieves system information from the NAD 130 by sending system information request 125. In other embodiments, when an API is closed (i.e. not publicly available) for the particular NAD 130, layer 120 may request that the tenant, who is hosted on remote server 140, send system information request 125 to the NAD 130 and provide the received information to layer 120. System information 135 collected from a particular NAD 130 may include, for example, system logs detailing events that occurred during the operation of the NAD, past and current configurations, diagnostic information gathered from a self-diagnosis, etc.

After collecting system information 135 from a particular NAD 130 or requesting a tenant to do so, layer 120 may create a support ticket 127 that may include a description of the user's problem, the collected system information 135, and information disclosing that layer 120 is authorized to make the request on behalf of the user. In various embodiments, layer 120 collects additional information from third-party systems that may be pertinent in resolving the user's problem before creating the support ticket 127. As an example, layer 120 may gather weather information detailing the current temperature, which the tenant may use to determine that neither the thermostat nor the A/C is broken, rather the A/C is struggling to keep up with the high temperatures. Temperature information is one example of "environmental information" that provides context about the environment of the particular NAD that is obtained from a source other than the NAD (i.e., from a third party). As another example of environmental information, a user may have a NAD such as a dish that relies on clear skies and thus layer 120 may gather information as to whether it is cloudy outside. Further examples of environmental information may include humidity, atmospheric pressure, a state (e.g., in operation, under maintenance, unavailable/down, etc.) of the local power grid, a state of the local water systems, a state of the local sewage systems, etc. Such information could also include video footage that depicts the particular NAD being diagnosed. In some cases, layer 120 may retrieve other types of third-party information, such as from forums and blogs that discuss the same or similar issues as being experienced with the user.

In response to receiving the support ticket 127 from layer 120, remote server 140 may provide the ticket to the appropriate tenant, who may diagnose the particular NAD 130 and determine a possible solution. Upon the tenant completing the diagnosis, remote server 140 may, in various embodiments, send results 145, which provide a detailed explanation of the problem and a possible solution for fixing the problem, to layer 120. In some cases, determining a solution may involve electronic communication with the NAD, electronic communication with a third-party system, communication with the user (e.g., chat, electronic message, telephonic (VoIP or otherwise), etc.), or some combination thereof.

Layer 120 may provide an advantageous improvement to diagnostic computer systems because of its ability to store authorizations (e.g., a list of NADs for which layer 120 may interact with) and use such authorizations to retrieve system information from NADs. That is, layer 120 may retrieve and provide information for diagnosing a NAD that a user would not otherwise be able to retrieve and provide. Furthermore, layer 120 may provide a platform capable of communicating with a broad range of intelligent assistant devices (e.g., SIRI, CORTANA, etc.). Even more, layer 120 may provide quicker responses to users requesting help by maintaining previous diagnostic interactions such that it may provide previous solutions for current problems.

Implementing such a system (e.g., system 100) may be advantageous to all parties involved. A user may be able to resolve problems with their NADs and, in various cases, prevent problems before they occur. A computer system implementing layer 120 may be able to achieve a deep learning of the users and the NADs involved in a way that permits the computer system to more accurately interpret and process users' requests along with predicting future problems with NADs. The computer system may also offer a unified support platform for voice, chat, text, messenger services (e.g., FACEBOOK messenger, WHATSAPP, etc.), etc. The tenant capable of diagnosing a NAD may be able to receive information usable to improve future products such that do not suffer the problems of their predecessors. The tenant may receive all the diagnostics logs necessary to perform a triage and ensure that problems are resolved in a timely manner.

Figure 2A:
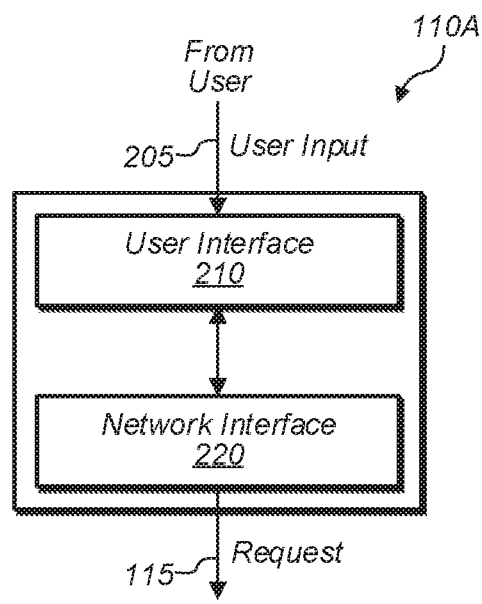
FIG. 2A is a block diagram illustrating exemplary elements of a communication device that generate a request for assistance in diagnosing a network-accessible device, according to some embodiments.

Turning now to FIG. 2A, a block diagram of one embodiment of a communication device 110 is depicted (shown as 110A) that is operable to generate an initial request 115 in response to input from a user (e.g., user input 205). As shown, device 110A includes a user interface 210 and a network interface 220. In various embodiments, device 110A may implement a chat-based form of communication (e.g., a chat box) in which a user provides a textual description of the problem. In contrast to the embodiment discussed below in FIG. 2B, device 110A may not implement an intelligent personal assistant. Accordingly, a user may have to provide the textual description in a defined format before device 110A processes it. That is, since device 110A may not be able to interpret natural forms of expression, device 110A may request that the user provide specific details in a specific order.

In various embodiments, a user provides a textual description to user interface 210 that is operable to generate request 115. After receiving and processing a request from the user, interface 210 may generate request 115 to include information that identifies the user, the particular NAD 130, and the problem, which may be based on the user's description or a reduced form of it. Thereafter, interface 210 may provide the generated request 115 to network interface 220 that is operable to send the request to layer 120. After request 115 has been processed by layer 120 and, subsequently, a tenant, device 110A may use the chat-based form of communication to allow the tenant to directly communicate the results of a diagnosis to the user (possibly in real-time, as that term is commonly understood in the art).

As an example, device 110A may present the user with an interface that includes a chat box. Assuming the user has a water heater that is a NAD, the user may type a description into the chat box about the water heater (e.g., brand, age, serial number, what is wrong, etc.) and submit the description. In this example, ten minutes later, a tenant may respond in the chat box (from an interface on their end) to the user by providing results from a diagnosis performed by the tenant. Thereafter, the user and the representative may continue to exchange communication with each other—e.g., the tenant describes how to fix the problem by guiding the user through a series of steps.

Figure 2B:
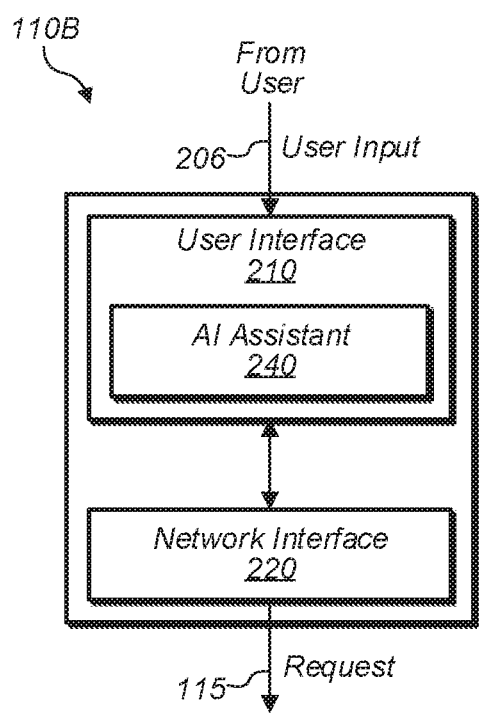
FIG. 2B is a block diagram illustrating exemplary elements of a communication device that include an intelligent personal assistant, according to some embodiments.

Turning now to FIG. 2B, a block diagram of another embodiment of communication device 110 is depicted (shown as 110B) that is operable to use natural forms of expression to generate an initial request 115 in response to input from a user (e.g., user input 206). As shown, device 110B includes a user interface 210 and network interface 220. In various embodiments, user interface 210 includes an AI Assistant 240. In order to process natural forms of expression, device 110B may execute instructions for a computer program (shown as AI assistant 240) that implements an intelligent personal assistant (e.g., ALEXA, CORTANA, SIRI, etc.) capable of converting speech to text and performing an action based on an interpretation of said text. In one embodiment, the personal assistant may be capable of interpreting the text without additional processing capacity and metadata. In another embodiment, the personal assistant provides the text to another computer system capable of processing it. That is, the personal assistant may not have sufficient processing capabilities or sufficient metadata (e.g., examples of user interactions, conversations, etc.) to process an expression and thus relies on another computer system (e.g., a database server) for interpretation of the text.

A user may initially setup devices 110B by installing appropriate toolkits that allow these devices to communicate with layer 120. As an example, assume device 110B is running ALEXA. A user may install a skill (i.e. a set of capabilities for ALEXA) that ALEXA uses when it determines that a user has spoken a particular phrase—e.g., a user says, "ALEXA, I need help with my thermostat." ALEXA may use the skill and information gathered from the user to both generate and send request 115 to network interface 220 and, subsequently, layer 120.

Figure 3:
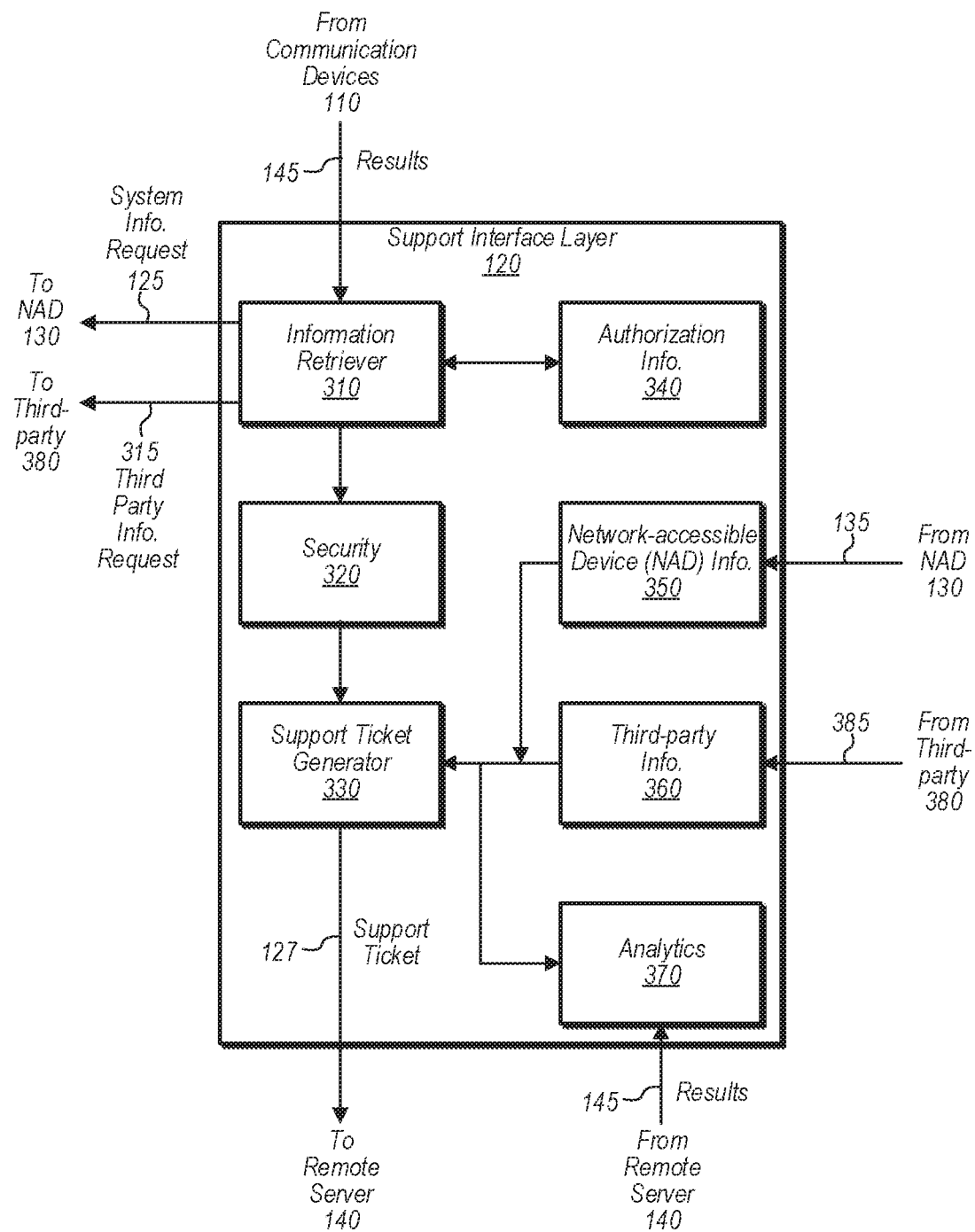
FIG. 3 is a block diagram illustrating exemplary elements of a support interface layer that facilitate the retrieval of system information from a network-accessible device and the generation of a support ticket, according to some embodiments

Turning now to FIG. 3, a block diagram of one embodiment of a support interface layer 120 is shown. In the various embodiments, layer 120 facilitates both the collection of information that may be relevant to a diagnosis of a problem and the generation of a support ticket that includes said information. (A "support ticket" is used generically herein to refer to any information regarding diagnosis of a reported problem.) As shown, layer 120 includes an information retriever 310, a security module 320 (shown as security 320), a support ticket generator 330, authorization information 340, network-accessible device information 350, third-party information 360, and an analytics module 370 (shown as analytics 370). As used herein, a "module" may refer to either a set of one or more software routines for performing a function, hardware for performing the function, or a combination of hardware and software. A "module" thus refers to a structural element.

Information retriever 310, in one embodiment, facilitates the collection of system information 135 and third-party information 385 for assisting in diagnosing or determining a problem with a NAD. Upon receiving request 115 from a user via a communication device 110, information retriever 310 may extract information from the request that includes an identifier specifying the user making the request, an identifier of the NAD that needs to be examined, and a general description from the user about the problem (unless the request is a maintenance check to determine potential problems). Thereafter, in order to determine whether layer 120 may create a support ticket 127, information retriever 310 may utilize the user identifier to retrieve authorization information 340 associated with the user. In various embodiments, authorization information 340 discloses a list of NADs 130 (and corresponding permissions) for which layer 120 may collect information from either directly or indirectly and may further use to create a support ticket 127 and/or perform its own analysis of the collected information. After retrieving authorization information 340, information retriever 310 may compare each NAD on the list with the NAD identifier extracted from the request. In the event that a match occurs, information retriever 310, in some embodiments, proceeds to collect system information 135 from the particular NAD 130.

As described above, depending on whether the API for communicating with the particular NAD 130 is opened or closed to layer 120, information retriever 310 may directly request information (e.g., system information 135) from the particular NAD 130 by sending a system information request 125, request that the tenant hosted on remote server 140 retrieve and provide this information to support interface layer 120 before support ticket 127 is created, or indicate in support ticket 127 that the tenant needs to retrieve this information separately. In the event that system information 135 may be retrieved directly or indirectly by layer 120, this information may be stored at NAD information 350 in association with an NAD identifier. Furthermore, information retriever 310 may request information from third-party systems 380 (shown as third-party information request 215) that may be used in resolving the problem with the particular NAD 130. As noted above, a few examples of third-party information include information about the environment in which the NAD exists (e.g., weather), information about other users' experiences (e.g., problems faced and solutions found), information about third-party testing of the software and hardware of the NAD, etc. In various embodiments, layer 120 stores information received from a third-party system (shown as 385) at third-party information 360.

Security module 320, in one embodiment, facilitates the establishment of communication between layer 120 and remote server 140 by authenticating layer 120 to remote server 140. In some embodiments, after layer 120 has received system information 135 from a particular NAD 130 and/or any useful information from a third-party system 380, information retriever 310 proceeds to send the initial request 115 to security module 320. Thereafter, module 320 may request an authentication token from remote server 140 that is usable to send support tickets 127. In one embodiment, module 320 periodically retrieves an authentication token independent of input from information retriever 310 and may further provide it to information retriever 310 in response to a request for it. As example, in order to request that a tenant retrieve information from a particular NAD 130, information retriever 310 may first need an authentication token to communicate with remote server 140 and, as such, module 320 may retrieve this authentication token and provide it to information retriever 310. Although shown in FIG. 3 as receiving input from information retriever 310, in other embodiments, module 320 receives the initial request 115 and provides both an authentication token and the request to information retriever 310.

Support ticket generator 330, in one embodiment, consolidates information provided by a user (e.g., the user's description of the problem) along with information retrieved from authorization information 340, NAD information 350, and third-party information 360 into a support ticket 127. In various embodiments, after retrieving an authentication token from remote server 140, module 320 proceeds to send both the initial request 115 and the authentication token to ticket generator 330. Thereafter, ticket generator 330 may retrieve information from NAD information 350 and third-party information 360 using identifiers included in the initial request—e.g., using a NAD identifier to retrieve information stored in association with the requested NAD by layer 120. In various embodiments, after retrieving information from various sources, ticket generator 330 generates support ticket 127 and provides it and the authentication token to remote server 140 for servicing.

Analytics module 370, in one embodiment, performs an analysis of the results (e.g., results 145) returned by a tenant. In some embodiments, after receiving support ticket 127, a tenant performs a diagnosis on the particular NAD 130 indicated by the ticket. When the diagnosis has been completed, the tenant may provide results 145 to analytics module 370 via remote server 140. In various embodiments, results 145 may include information about the problem (e.g., what part is broken/malfunctioning, how the part is broken, etc.), steps to be carried out to possibly fix the problem (i.e., a solution), an entity capable of fixing the problem using the steps (e.g., an electrician to fix a wiring problem), etc. The analysis performed by module 370 may be used to service future requests 115 from users without the assistance of a tenant. Such an analysis may include using all information available to layer 120 such as NAD information 350, third-party information 360, information included in a particular request 115, and/or information included in results 145.

As an example, a first user may request assistance in diagnosing a problem with their coffee maker and, as such, layer 120 may generate a support ticket 127 based on the user's request. Thereafter, a tenant may service the ticket and return results 145, which include a solution, to layer 120. After performing an analysis on the results to determine elements that define the problem and the solution, layer 120 may store the analysis in association with NAD information 250 and third-party information 260. When a second user requests assistance in diagnosing a problem with their coffee maker, layer 120 may retrieve system information 135 from the coffee maker to determine whether such information is similar to NAD information 250 stored for other coffee makers of the same model. Layer 120 may also determine whether the problem suggested by the second user is similar to the problem suggested by first user in their request. In response to determining that the issue faced by the second user is similar or matches the issue faced by the first user, layer 120 may provide, to the second user, the solution included in the results associated with the first user. In this way, layer 120 may be able, in some instances, to service similar requests without the assistance of a tenant.

In various embodiments, layer 120 may periodically send, to remote server 140, requests for an update on the status of a ticket 127. This may be useful because a diagnosis may take time to be performed by a tenant and thus layer 120 may continually ask the tenant where it is in the diagnosis process, when the results will be ready, etc. After receiving results 145 from remote server 140, in various embodiments, layer 120 sends the results to the requesting user. In order to do so, layer 120 may first determine how to reach the user. That is, layer 120 may select a form of communication (e.g., email, text, etc.) based on information provided by the user as means for contacting the user after the diagnosis has been performed. In this way, layer 120 may send results 145 to the appropriate user device. In some embodiments, layer 120 also assists the tenant in establishing communication with the user—e.g., layer 120 sets up a chat box through which the user and the representative may exchange information.

Layer 120 may be referred to as an "intelligence layer" since, in one embodiment, layer 120 implements neural networks (or other such systems) for purposes of deep learning. That is, layer 120 may study the interactions (e.g., request 115, ticket 127, results 145, etc.) encompassed in the entire system 100 in order to predict problems before they occur, more easily and efficiently address problems when they occur, and provide feedback to manufacturers about their NADs. These neural networks may be included in module 370. Not all implementations of layer 120 need include neural networks, however.

Figure 4:
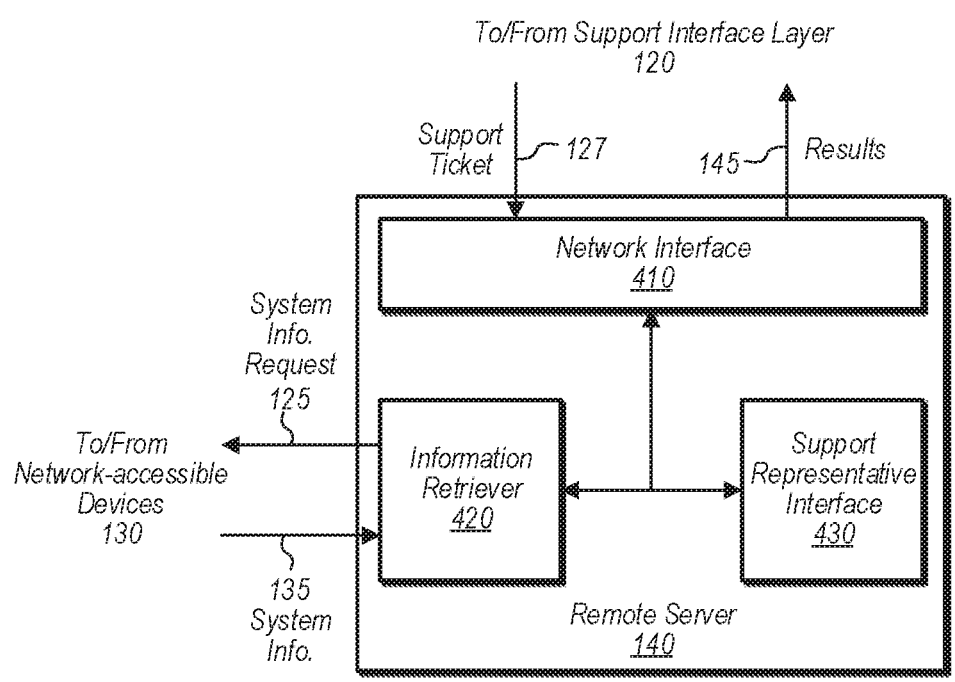
FIG. 4 is a block diagram illustrating exemplary elements of a remote server that facilitate diagnosis of a problem discovered in a network-accessible device, according to some embodiments

Turning now to FIG. 4, a block diagram of one embodiment of a remote server 140 is shown. In the illustrated embodiment, remote server 140 facilitates both the collection of information that may be relevant to a diagnosis and the performance of a diagnosis on a NAD 130. As shown, remote server 140 includes a network interface 410, an information retriever 420 (similar to retriever 310), and a tenant interface 430. In various embodiments, remote server 140 may host a plurality of tenants including their data and software. A tenant (e.g., a manufacturer including physical support representatives) may be described as performing a diagnosis, such diagnosis may include using a combination of software executing on server 140 and an assessment made by a physical person. That is, a tenant performing a diagnosis may refer to either or both software performing a diagnosis and/or a physical person performing the diagnosis.

Network interface 410, in one embodiment, facilities communication between layer 120 and support representative interface 430. In response to receiving support ticket 127, interface 410 may determine which of a plurality of tenants to send the ticket to for service. To determine the tenant, interface 410 may use information included in ticket 127 (e.g., the tenant selected by layer 120) and information stored by server 140 that may include a list of tenants hosted by server 140. As an example, interface 410 may determine that a particular ticket 127 includes an identifier for a NEST Learning Thermostat™ and that server 140 host NEST as a tenant. In such a case, interface 410 may provide the particular ticket 127 to NEST for servicing at interface 430. In various embodiments, network interface 410 receives a request from layer 120 to establish a communication channel between the two systems (e.g., layer 120 and server 140). In response to verifying layer 120 (e.g., verifying a security certificate), interface 410 may provide, to layer 120, an authentication token usable to establish the requested channel.

Support representative interface 430, in one embodiment, facilities the diagnosis of a NAD 130 and the communication between a physical support representative and the requesting user. In various embodiments, interface 430 includes software unique to each tenant hosted by remote server 140 that is operable to diagnose a NAD associated with that representative. Interface 430 may further include software executable to display an interface (e.g., chat box) through which a tenant may directly communicate with a user.

Initially, interface 430 may receive ticket 127 from network interface 410 and determine whether the ticket includes information (e.g., system information 135, third-party information 360, etc.) relevant to the NAD 130 specified by the ticket. In some embodiments, interface 430 may retrieve and use profile information for a user stored at server 140 so that a personalized, contextual service may be provided to the user. For example, the user may have a repairman that they like and thus interface 430 may assist the user in setting up an appointment if it is determined that the problem may be resolved by the particular repairman.

In various embodiments, interface 430 determines the severity of the problem indicated in ticket 127 and, based on the severity, facilitates a quicker resolution of the problem. That is, interface 430 may rank tickets 127 based on the severity of the problem so that more severe problems are addressed sooner than less severe problems. In order to determine the severity of the problem, in various embodiments, server 140 may store a list of known issues for a particular NAD 130 and their corresponding level of severity, which interface 430 may compare against the issue indicated in ticket 127. Interface 430 may also determine the severity of the problem based on a user's description of the problem—e.g., the user states the problem requires immediate action or attention. In some embodiments, layer 120 determines the severity of problem and provides an indication to the support representative that a particular ticket 127 has a high priority.

In various embodiments, interface 430 determines whether layer 120 is authorized to request that interface 430 perform a diagnosis based on authorization information that may be included in ticket 127. In the cases where ticket 127 does not include necessary information (e.g. system information 135), interface 430 may retrieve such information by means of an information retriever 420. In various embodiments, retriever 420 implements the same functionality as disclosed in regards to retriever 310. That is, retriever 420 may retrieve information from a particular NAD 130 or third-party system 380; however, unlike retriever 310, retriever 420 may not be restricted by the nature of the API (i.e., whether the API is closed or open) because retriever 420 performs the retrieval on behalf of the tenant. As such, in some cases, retriever 420 may send system information request 125 when retriever 310 cannot.

After retriever 420 provides system information 135 to interface 430, in various embodiments, interface 430 automatically (or through manual input from a physical representative) executes software to perform a diagnosis of the requested NAD 130. Such a diagnosis may result in several outcomes. In one case, the results (e.g., results 145) of the diagnosis may include information about the discovered problem (e.g., how the NAD malfunctioned, a point of physical failure if appropriate, when the NAD malfunctioned, etc.) and one or more recommended solutions to that problem. The one or solutions may include, but are not limited to, a series of steps that the user may perform to fix the NAD, contact information for someone able to repair the NAD (e.g., electrician) along with information to guide a repairperson in repairing the device, steps that the tenant may perform to repair the NAD, operations that the software may automatically perform to repair the NAD, etc. In some embodiments, interface 430 calculates a probability of success in regards to whether a proposed solution will fix a problem. Accordingly, interface 430 may provide a ranked list of solutions—e.g., the first recommend solution has a higher chance of working than the next recommend solution. In another case, the results may include only information about the discovered problem. In the cases where the software may correct the problem, interface 430 may send, to the particular NAD 130, requests (not shown) for adjusting configuration settings, performing a reset, installing an update, etc.

Upon completing a diagnosis and generating results for a particular NAD 130, in some embodiments, interface 430 provides the results to interface 410, which sends them to layer 120 (shown as results 145). In some embodiments, interface 430 also establishes a communication channel (with the help of layer 120 in some instances) with the requesting user through which the tenant provides the results. As an example, a chat box may be created that allows the user and the representative to communicate with each other and thus the representative may provide the results (e.g., in the form of a link, text document, etc.) to the user.

Figure 5:
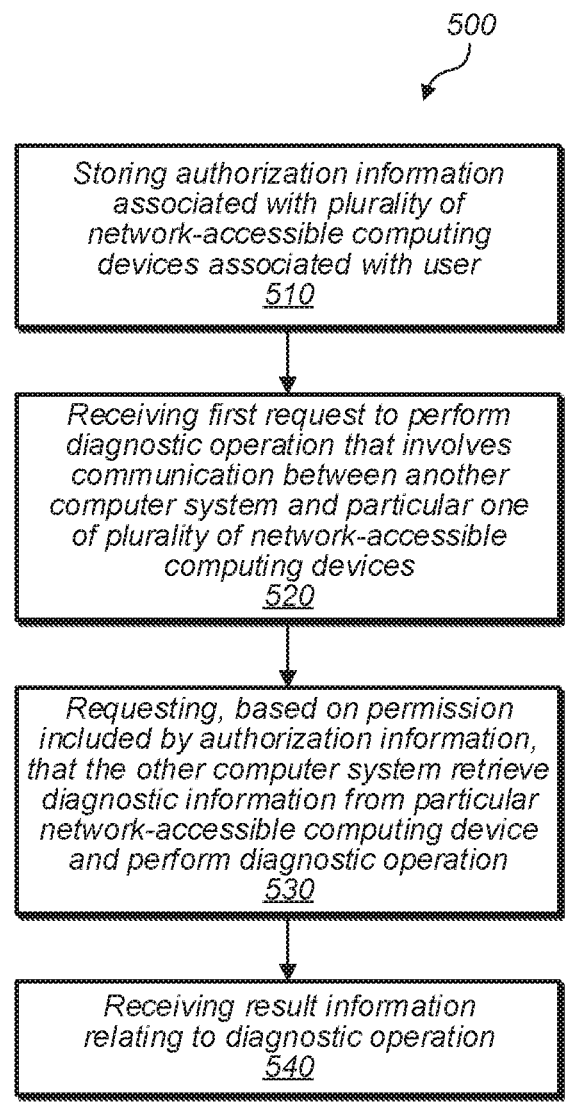
FIG. 5 is a flow diagram illustrating an exemplary method for processing a request from a user for assistance in diagnosing a network-accessible device.

Turning now to FIG. 5, a flow diagram of a method 500 is depicted. Method 500 is one embodiment of a method for processing, by a computer system such as layer 120, a request (e.g., request 115) from a user for assistance in diagnosing a NAD (e.g., NAD 130). In many instances, when a user has a question about a particular NAD or is experiencing a problem with that NAD, the user may cause a computer system such as support interface layer 120 to perform the steps of method 500. In various embodiments, method 500 may include additional steps such as retrieving third-party information relevant to the particular NAD, retrieving an authentication token from another computer system (e.g., remote server 140), providing the results of method 500 to the requesting user, and so on.

Method 500 begins in step 510 with a computer system storing authorization information (e.g., authorization information 340) for a plurality of network-accessible computing devices (e.g., NADs 130) associated with a user. In various embodiments, the authorization information includes authorization for the computer system to request, on behalf of a user, that another computer system perform a diagnosis of a NAD specified by the user.

In step 520, the computer system receives a request, from a user via a user device (e.g., a communication device 110), to perform a diagnostic operation that involves communication between another computer system (e.g., remote server 140) and a particular one of the plurality of network-accessible computing devices. In some embodiments, the received request includes information (e.g., a user identifier, a NAD identifier, a user's description of the problem, etc.) that may assist the computer system in generating a support ticket and the other computer system in diagnosing the requested NAD.

In step 530, the computer system requests that the other computer system retrieve diagnostic information (e.g., system information 135) from the requested NAD and perform a diagnostic operation on said NAD. Before sending the request, the computer system may determine, based on the authorization information, whether it has permission to request that the other computer system perform operations in relation to the requested NAD. In some embodiments, the computer system retrieves the diagnostic information from the requested NAD and provides the information in the request to the other computer system instead of requesting that the other computer system retrieve such information.

In step 540, the computer system receives information relating to the diagnostic operation performed by the other computer system, which the information may include results. In various embodiments, the results include a detailed description of the problem and one or more possible solutions to said problem. In some instances, the received information includes results for multiple problems and thus multiple solutions. In response to receiving the information, the computer system may provide the information to the requesting user.

Figure 6:
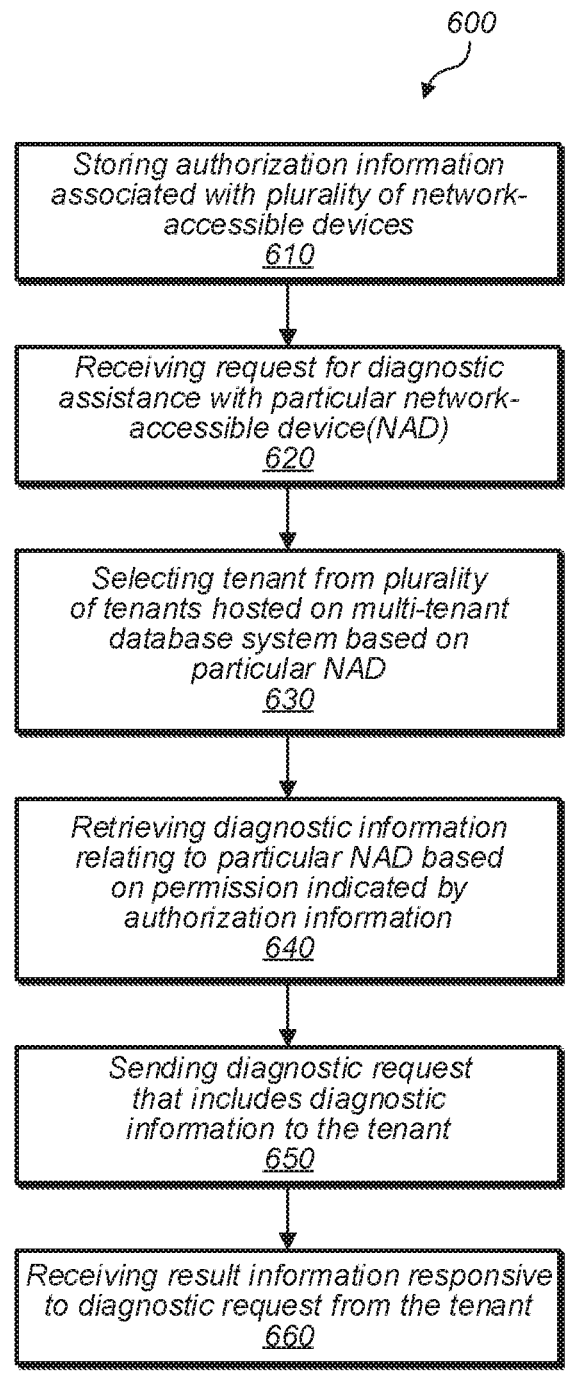
FIG. 6 is a flow diagram illustrating another exemplary method for processing a request from a user for assistance in diagnosing a network-accessible device.

Turning now to FIG. 6, a flow diagram of a method 600 is depicted. Method 600 is another embodiment of a method for processing, by a computer system such as layer 120, a request (e.g., request 115) from a user for assistance in diagnosing a NAD (e.g., NAD 130). In various embodiments, method 600 may include additional steps such as retrieving third-party information relevant to the particular NAD, retrieving an authentication token from a multi-tenant database system (e.g., remote server 140), providing the results of method 500 to the requesting user, and so on.

Method 600 begins in step 610 with a computer system storing authorization information (e.g., authorization information 340) for a plurality of network-accessible computing devices (e.g., NADs 130) associated with a user. In various embodiments, the authorization information includes one or more authorizations for the computer system to retrieve diagnostic information (e.g., system information 135) from the plurality of NADs.

In step 620, the computer system receives a request, from a user via a user device (e.g., communication devices 110), for diagnostic assistance with a particular one of the plurality of network-accessible computing devices. In some embodiments, the received request includes information (e.g., a user identifier, a NAD identifier, a user's description of the problem, etc.) that may assist the computer system in retrieving diagnostic information from the particular NAD and generating a support ticket. In step 630, the computer system selects a tenant (e.g., a support representative) from a plurality of tenants hosted on the multi-tenant database system based on the particular NAD. That is, the computer system may use the information included in the request, such as the NAD identifier, to determine a tenant capable of diagnosing the particular NAD.

In step 640, the computer system retrieves diagnostic information from the particular NAD based on a permission indicated by the stored authorization information. In step 650, the computer system sends a diagnostic request (e.g., ticket 127) to the selected tenant that includes the retrieved diagnostic information. In various embodiments, the diagnostic request also includes information that had been included in the initial request from the user. In step 660, the computer system receives results from the tenant that pertain to a diagnosis performed by the tenant.

Figure 7:
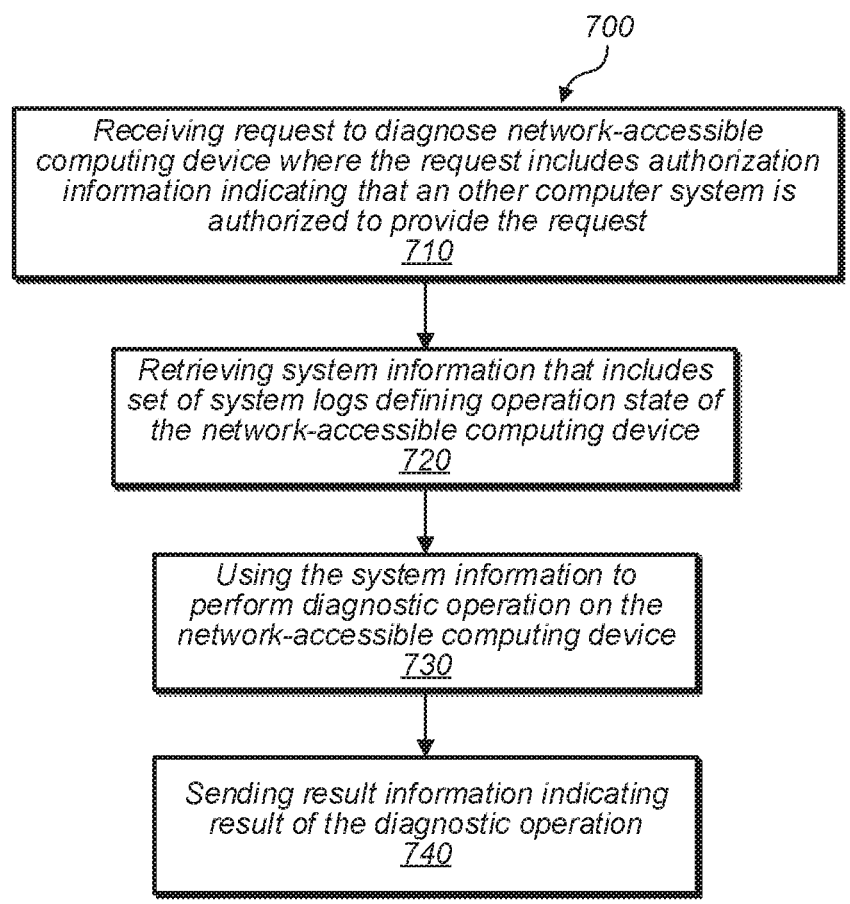
FIG. 7 is a flow diagram illustrating an exemplary method for performing a diagnosis of a network-accessible device.

Turning now to FIG. 7, a flow diagram of a method 700 is depicted. Method 700 is one embodiment of a method performed by a computer system such as remote server 140 to diagnose a NAD (e.g., NAD 130). In many instances, when a user is experiencing a problem with a NAD, the computer system may perform the steps of method 700 to assist the user in resolving the problem. In one embodiment, method 700 includes additional steps such as retrieving third-party information relevant to the particular NAD, providing an authentication token to another computer system (e.g., layer 120), providing the results of method 700 to the other computer system, and so on.

Method 700 begins in step 710 with a computer system receiving a request to diagnose a network-accessible computing device. In some embodiments, the request may include one or more authorizations for the requesting computer system (e.g., layer 120) to request that the computer system perform such a diagnosis. The request may also include information (e.g., a user identifier, a NAD identifier, a user's description of the problem, etc.) that may assist the computer system in retrieving diagnostic information from the particular NAD.

In step 720, the computer system retrieves system information from the NAD that includes a set of system logs (e.g., system information 130) defining an operation state of the NAD. In various embodiments, the operation state may indicate that an error occurred in the operation of the NAD—e.g., a sensor malfunctioned. In step 730, the computer system uses the system information to perform a diagnostic operation on the NAD. In step 740, the computer system provides results to the requesting computer system that may include a description of the problem and a possible solution to fix said problem.

Figure 8:
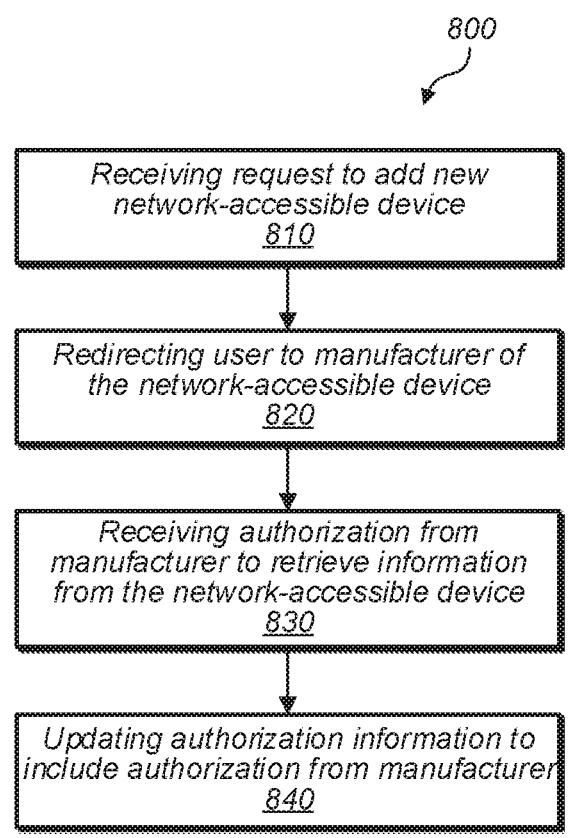
FIG. 8 is a flow diagram illustrating another exemplary method for authorizing a computer system to retrieve information form a network-accessible device.

Turning now to FIG. 8, a flow diagram of a method 800 is depicted. Method 800 is one embodiment of a method for authorizing a computer system such as support interface layer 120 to retrieve information from a NAD. In another embodiment, instead of authorizing a computer system, the steps of method 800 may be performed to remove authorization from the computer system—e.g., step 810 includes a request to remove a NAD instead of adding one. In yet other embodiments, method 800 is performed to receive authorization to open a support ticket with the tenant associated with the NAD. Method 800 may include additional steps such as the user logging into the computer system prior to adding a new NAD. Furthermore, the computer system may perform the steps of method 800 for a particular NAD prior to receiving a request to diagnose said NAD.

In step 810, the computer system receives a request from a user to add a new NAD to their account. In some embodiments, step 810 includes presenting an interface on a display of a user device (e.g., communication device 110) that allows the user add or remove NADs. Furthermore, the user may be required by the computer system to provide information about the new NAD such as the manufacture, a model number, etc.

In step 820, the computer system redirects the user to a website of the tenant associated with the NAD that the user is adding to their account. Upon being redirected to the website, the user may provide authentication information to the tenant for logging into an account at the website. Thereafter, the website may provide an interface to the user for granting (or rejecting) the computing system access to the NAD. To proceed to step 830, the website redirects the user back to the computer system and notifies the computer system of the authorization. That is, in response to receiving an authorization request for authorization to cause the tenant to perform diagnostics, the tenant hosted by a remote system (e.g., remote server 140) may provide authorization information (e.g., a token) to the computer system.

In step 830, the computer system receives authorization from the tenant to retrieve information from the NAD. In some embodiments, instead of granting access to NAD, the authorization permits the computer system to request that the tenant retrieve such information on behalf of the computer system. In yet another embodiment, the authorization permits the computer system to request that the tenant diagnose a problem discovered in the NAD. In step 840, the computer system updates its own authorization information (e.g., authorization information 340) to include the received authorization.

Figure 9:
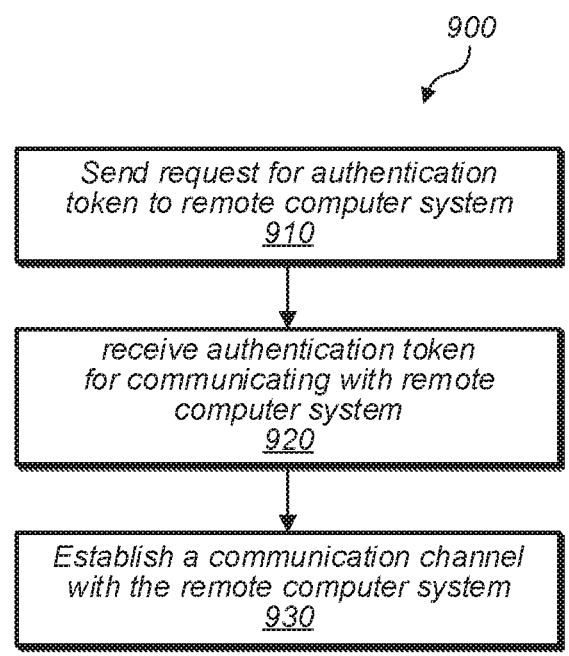
FIG. 9 is a flow diagram illustrating an exemplary method for retrieving an authentication token to establish communication between a support interface layer and a remote server.

Turning now to FIG. 9, a flow diagram of a method 900 is depicted. Method 900 is one embodiment of a method for retrieving an authentication token for establishing communication between a computer system (e.g., support interface layer 120) and a remote computer system (e.g., remote server 140). In some embodiments, the authentication token may be used to establish a communication between the remote computer system and a communication device associated with a user (e.g., communication devices 110). The computer system may perform the steps of method 900 in response to a request from the user for assistance in diagnosing a problem with their NAD (e.g., initial request 115). In various embodiments, the computer system performs the steps of method 900 at set time intervals instead of in response to a request. Method 900 may include additional steps such as determining whether to retrieve a new authentication token from the remote computer system.

In step 910, the computer system sends a request for an authentication token from the remote computer system. In some embodiments, the computer system identifies itself to the remote computer system by providing a security certificate that shows that a trusted third-party entity has verified the integrity of the entity associated with the computer system. In response to determining that the request is authentic, the remote computer system may transmit an authentication token to the computer system.

In step 920, the computer system receives the authentication token from the remote computer system. In some embodiments, the computer system receives a notification that the remote computer system will not be establishing communication with the computer system because it cannot be trusted.

In step 930, the computer system establishes a communication channel with the remote computer system using the authentication token. The communication channel may allow the computer system to send support tickets (e.g., support ticket 127) to the remote computer system. In some embodiments, the computer system attaches the authentication token with each request (e.g., support ticket 127) sent to the remote computer system.

Figure 10:
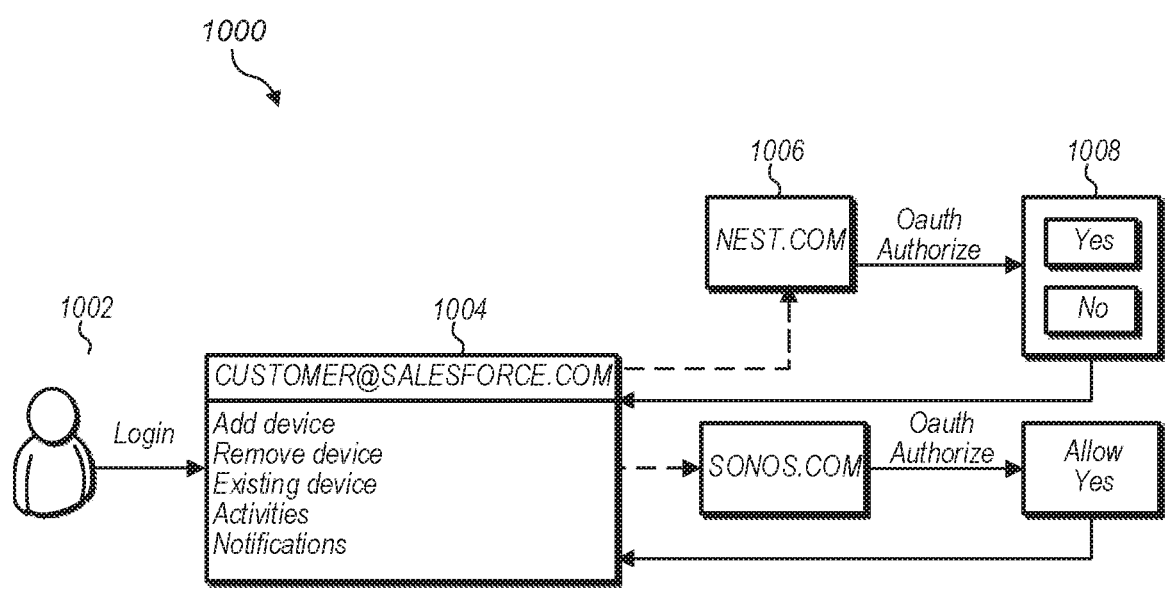
FIG. 10 is a block diagram illustrating an exemplary diagram of a method for authorizing a computer system to retrieve information from a network-accessible device.

Turning now to FIG. 10, an exemplary illustration of method 800 for authorizing a computer system to retrieve information from a network-accessible device is shown. In various embodiments, the computer system is implemented as support interface layer 120 or a separate computer system configured to communicate the outcome of method 800 to support interface layer 120. When a user (e.g., 1002) desires to add (i.e. authorize) or remove a NAD from their account, the user may log into the computer system and select one of various options as shown (e.g., 1004)—e.g., add device, remove device, view existing devices, etc. Thereafter, the user may provide an indication of the particular NAD that he or she wishes to add (or remove). As shown in the exemplary illustration, when the user specifies a NEST Learning Thermostat™ to be added to their account, the computer system redirects the user to the NEST website (e.g., 1006) where the user is presented with the option to authorize the device (e.g., 1008). In various embodiments, prior to the NEST system presenting the user with the option, the user provides authorization credentials to the NEST system for logging the user into the system. In response to the user's selection of whether to authorize the device, the NEST system may redirect the user back to the computer system and provide an indication of the user's selection to the computer system. Thereafter, the computer system may update its authorization information to include the received authorization (or rejection).

Figure 11:
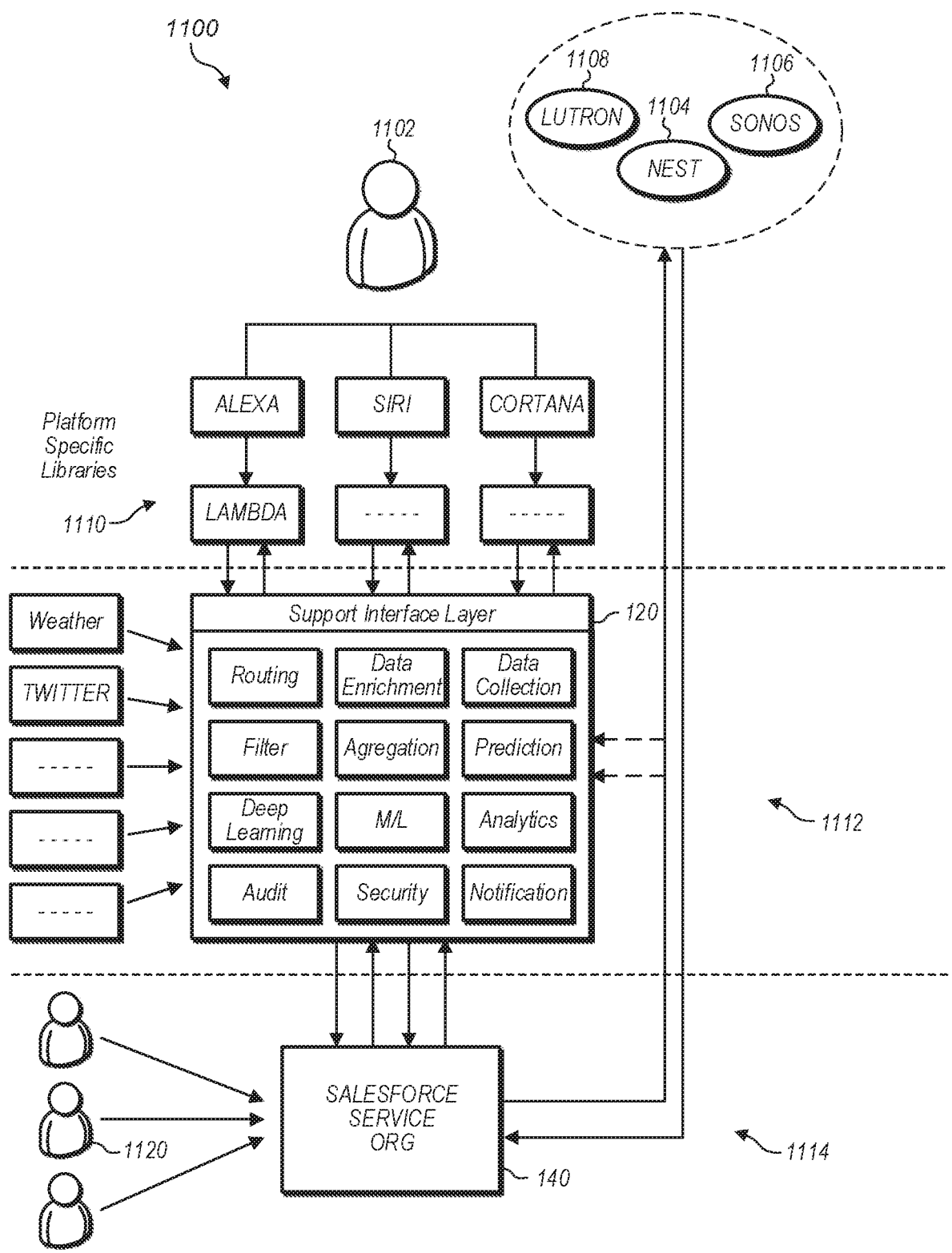
FIG. 11 is a block diagram illustrating an exemplary system that facilitates the resolution of a problem discovered in a network-accessible device, according to some embodiments.

Turning now to FIG. 11, an exemplary illustration of system 100 that facilitates the resolution of a problem discovered in a NAD associated with a user is shown. In various embodiments, a user (e.g., 1102) may verbally communicate to a personal assistant (shown as ALEXA, SIRI, CORTANA) that there may be a problem with a NAD (e.g., 1104, 1106, and 1108). In response to the communication, the personal assistant may send a request to a support interface layer (e.g., 120) for assistance in diagnosing a potential problem discovered by the user. In various embodiments, a personal assistant may use a platform specific library 1110 to send the request—e.g., ALEXA may use Lambda, which is a platform that allows consumers to run applications without worrying about managing servers. After receiving the request from the personal assistant, layer 120 may gather information from third-party systems—e.g., weather, twitter, etc. In some cases, layer 120 may gather system information from the NAD if authorized to do so. In other cases, layer 120 relies on remote server 140 (shown as Salesforce Service Org) to retrieve such information. Once information has been gathered, layer 120 may open a support ticket (e.g., ticket 127) with a tenant (e.g., 1120) hosted by remote server 140. Thereafter, the tenant may perform a diagnosis of the NAD and return results of the diagnosis to layer 120, which in turn may provide the results to the user.

Exemplary Computer System

Figure 12:
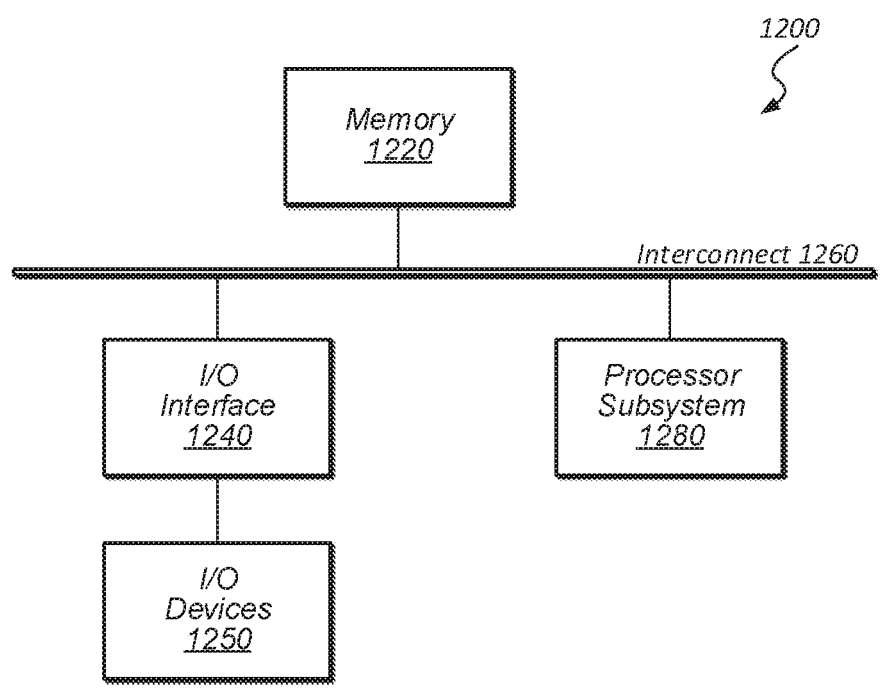
FIG. 12 is a block diagram illustrating an exemplary computer system, according to some embodiments.

Turning now to FIG. 12, a block diagram of an exemplary computer system 1200, which may implement any of the various computer system disclosed herein, is depicted. Computer system 1200 includes a processor subsystem 1280 that is coupled to a system memory 1220 and I/O interfaces(s) 1240 via an interconnect 1260 (e.g., a system bus). I/O interface(s) 1240 is coupled to one or more I/O devices 1250. Computer system 1200 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 1200 is shown in FIG. 12 for convenience, system 1200 may also be implemented as two or more computer systems operating together.

Processor subsystem 1280 may include one or more processors or processing units. In various embodiments of computer system 1200, multiple instances of processor subsystem 1280 may be coupled to interconnect 1260. In various embodiments, processor subsystem 1280 (or each processor unit within 1280) may contain a cache or other form of on-board memory.

System memory 1220 is usable store program instructions executable by processor subsystem 1280 to cause system 1200 perform various operations described herein. System memory 1220 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 1200 is not limited to primary storage such as memory 1220. Rather, computer system 1200 may also include other forms of storage such as cache memory in processor subsystem 1280 and secondary storage on I/O Devices 1250 (e.g., a hard drive, storage array, etc.). In some embodiments, these other forms of storage may also store program instructions executable by processor subsystem 1280.

I/O interfaces 1240 may be any of various types of interfaces configured to couple to and communicate with other devices, according to various embodiments. In one embodiment, I/O interface 1240 is a bridge chip (e.g., Southbridge) from a front-side to one or more back-side buses. I/O interfaces 1240 may be coupled to one or more I/O devices 1250 via one or more corresponding buses or other interfaces. Examples of I/O devices 1250 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 1200 is coupled to a network via a network interface device 1250 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory, computer readable medium having program instructions stored thereon that are executable to cause an interface layer computer system to perform operations comprising:

storing, at a database of the interface layer computer system, authorization information that identifies a plurality of network-accessible computing devices associated with a user, wherein the authorization information grants the interface layer computer system permission to request diagnostic operations for the plurality of network-accessible computing devices that are associated with the user;

implementing an interface layer to facilitate communication between separate computer systems that include:
the plurality of network-accessible computing devices associated with a user;
a multi-tenant diagnostic computer system that hosts a plurality of tenants operable to provide diagnostic support for the plurality of network-accessible computing devices; and
a diagnostic-requesting computer system that is remote from the interface layer computer system and is operable to receive user input to initiate diagnostic operations for the plurality of network-accessible computing devices, wherein the implementing of the interface layer by the interface layer computer system includes:
receiving, from the diagnostic-requesting computer system, a request to perform a diagnostic operation that involves communication between the multi-tenant diagnostic computer system and a particular one of the plurality of network-accessible computing devices, wherein the request includes a device identifier for the particular network-accessible computing device;
accessing, based on the device identifier, a portion of the authorization information that is associated with the particular network-accessible computing device;
selecting, based on the portion of the authorization information, a tenant from the plurality of tenants that corresponds to the particular network-accessible computing device;
requesting, based on the portion of the authorization information, that the tenant retrieve diagnostic information from the particular network-accessible computing device and perform the diagnostic operation;
receiving, from the tenant via the multi-tenant diagnostic computer system, result information relating to the diagnostic operation;
providing the result information to the user via a user device that is associated with the user; and
wherein the interface layer computer system permits the user to request the diagnostic operation without the diagnostic-requesting computer system communicating with the multi-tenant diagnostic computer system.

2. The computer readable medium of claim 1, wherein the result information includes a solution to a problem associated with the particular network-accessible computing device.

3. The computer readable medium of claim 1, wherein the result information includes a solution to a problem associated with the particular network-accessible computing device, and wherein the operations further comprise:
performing an analysis on the result information to determine elements for identifying the problem and the solution;
storing information associated with the analysis; and
using the stored information associated with the analysis to resolve a subsequent diagnostic request associated with a different network-accessible computing device.

4. The computer readable medium of claim 1, wherein the operations further comprise:
receiving, from a different tenant hosted by the multi-tenant diagnostic computer system, authorization to request that the different tenant retrieve diagnostic information from an additional network-accessible computing device; and
updating the authorization information to indicate the authorization for the additional network-accessible computing device.

5. The computer readable medium of claim 1, wherein the operations further comprise:
sending, to the multi-tenant diagnostic computer system, an authentication request to establish a communication link between the interface layer computer system and the multi-tenant diagnostic computer system; and
in response to approval of the authentication request by multi-tenant diagnostic computer system, establishing the communication link to permit subsequent diagnostic reporting between the interface layer computer system and multi-tenant diagnostic computer system.

6. The computer readable medium of claim 1, wherein the operations further comprise:
retrieving, from a third-party system, environmental information pertaining to the particular network-accessible computing device; and
providing the environmental information to the multi-tenant diagnostic computer system.

7. The computer readable medium of claim 1, wherein the operations further comprise:
prior to receiving the result information, the interface layer computer system polling the multi-tenant diagnostic computer system to determine a state of the diagnostic operation.

8. The computer readable medium of claim 1, wherein the multi-tenant diagnostic computer system is remote from the interface layer computer system.

9. A method, comprising:
an interface layer computer system storing, at a database of the interface layer computer system, authorization information that identifies a plurality of network-accessible computing devices associated with a user, wherein the authorization information grants the interface layer computer system permission to request diagnostic operations for the plurality of network-accessible computing devices that are associated with the user;
the interface layer computer system implementing an interface layer to facilitate communication between separate computer systems that include:
a plurality of network-accessible computing devices associated with a user;
a multi-tenant diagnostic database system that hosts a plurality of tenants that provide diagnostic support for the plurality of network-accessible computing devices; and
a diagnostic-requesting computer system that is remote from the interface layer computer system and is operable to receive user input to initiate diagnostic operations for the plurality of network-accessible computing devices,
wherein the implementing of the interface layer by the interface layer computer system includes:
receiving, from the user via the diagnostic-requesting computing system, a request for diagnostic assistance with a particular one of the plurality of network-accessible computing devices, wherein the request includes a device identifier for the particular network-accessible computing device;
accessing, based on the device identifier, a portion of the authorization information that is associated with the particular network-accessible computing device;
selecting, based on the portion of the authorization information, a tenant from the plurality of tenants that provides diagnostic support for the particular network-accessible computing device;
based the portion of the authorization information, retrieving particular system information from the particular network-accessible computing device;
sending, to the tenant via the multi-tenant diagnostic database system, a diagnostic request that requests that the tenant diagnose the particular network-accessible computing device, wherein the diagnostic request includes the particular system information;
receiving, from the tenant via the multi-tenant diagnostic database system, result information responsive to the diagnostic request; and
providing the result information to the user via a user device that is associated with the user.

10. The method of claim 9, further comprising:
the interface layer computer system sending, to the multi-tenant diagnostic database system, a communication request to permit the interface layer computer system to establish a communication channel to exchange data with the tenant;
the interface layer computer system receiving a response from the multi-tenant diagnostic database system that includes an authentication token; and
the interface layer computer system using the authentication token to establish the communication channel.

11. The method of claim 9, further comprising:
the interface layer computer system establishing a communication channel between the tenant and a user computing device of the user, wherein the communication channel permits the tenant to send the result information to the user computing device.

12. The method of claim 9, further comprising:
the interface layer computer system storing the system information and the result information in a particular record, wherein the particular record is useable to resolve subsequent requests associated with a different network-accessible device.

13. The method of claim 9, wherein the system information defines a current state of operation of the particular network-accessible computing device.

14. The method of claim 9, further comprising:
the interface layer computer system retrieving, from a third-party system, additional information relating to the particular network-accessible computing device; and
the interface layer computer system providing the additional information to the tenant hosted by the multi-tenant diagnostic database system.

15. A non-transitory computer readable medium having program instructions stored thereon that are executable to cause a multi-tenant diagnostic computer system to perform operations comprising:
hosting a plurality of tenants, wherein a given one of the plurality of tenants is operable to provide diagnostic support for a respective network-accessible computing device;
receiving, from an interface layer computer system, a request to diagnose a particular network-accessible computing device, wherein the request includes authorization information indicating that the interface layer computer system is authorized to provide the request, and wherein the interface layer computer system, the multi-tenant diagnostic computer system, and the particular network-accessible computing device are separate computer systems;
determining, from the plurality of tenants based on the request, a particular tenant that is operable to diagnose the particular network-accessible computing device;
retrieving, from the particular network-accessible computing device on behalf of the particular tenant, system information that indicates an operational state of the particular network-accessible computing device;
providing the request and the system information to the particular tenant for performing a diagnostic operation on the particular network-accessible computing device; and
sending, to the interface layer computer system on behalf of the particular tenant, result information indicating a result of the diagnostic operation.

16. The computer readable medium of claim 15, wherein the operations further comprise:
receiving, from a user device of a user associated with the particular network-accessible computing device, an authorization request to authorize the interface layer computer system to request that the particular tenant perform diagnostics on behalf of the user; and
in response to receiving the authorization request, sending authorization information to interface layer computer system indicating an authorization to request that the particular tenant perform diagnostics for the particular network-accessible computing device.

17. The computer readable medium of claim 15, wherein the operations further comprise:
- receiving, from the interface layer computer system, a request to establish a communication channel between the interface layer computer system and the multi-tenant diagnostic computer system; and
- in response to receiving the request, sending an authentication token to the interface layer computer system.

18. The computer readable medium of claim 15, wherein the operations further comprise:
- establishing a communication channel with a user device of a user associated with the particular network-accessible computing device; and
- sending, to the user via the established communication channel, result information based on the diagnostic operation.

19. The computer readable medium of claim 15, wherein the operations further comprise:
- in response to the particular tenant performing the diagnostic operation, sending, to the particular network-accessible computing device, a request to update system configurations of the particular network-accessible computing device in order to resolve a problem.

* * * * *